United States Patent
Jubert et al.

(10) Patent No.: US 8,582,235 B2
(45) Date of Patent: Nov. 12, 2013

(54) MAGNETIC WRITE HEAD WITH STRUCTURED TRAILING POLE

(75) Inventors: Pierre-Olivier Jubert, San Jose, CA (US); Mark Alfred Lantz, Adliswil (CH); Hugo E Rothuizen, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/603,475

(22) Filed: Sep. 5, 2012

(65) Prior Publication Data

US 2013/0003224 A1    Jan. 3, 2013

Related U.S. Application Data

(63) Continuation of application No. 13/441,183, filed on Apr. 6, 2012.

(30) Foreign Application Priority Data

Apr. 14, 2011    (EP) .................................. 11162391

(51) Int. Cl.
*G11B 5/127*    (2006.01)
(52) U.S. Cl.
USPC .................................................. 360/125.03

(58) Field of Classification Search
USPC ......... 360/119.01, 119.05, 119.13; 29/603.14
See application file for complete search history.

(56) References Cited

U.S. PATENT DOCUMENTS

| | | | |
|---|---|---|---|
| 4,951,166 A | 8/1990 | Schewe | |
| 5,014,149 A | 5/1991 | Ibaraki | |
| 5,949,625 A | 9/1999 | Sato | |
| 6,301,075 B1 * | 10/2001 | Sato | 360/125.5 |
| 6,707,643 B2 | 3/2004 | Takeo | |
| 7,133,252 B2 | 11/2006 | Takano | |
| 2004/0150912 A1 | 8/2004 | Kawato et al. | |
| 2004/0257699 A1 | 12/2004 | Hsu et al. | |
| 2005/0135007 A1 | 6/2005 | Nishikawa et al. | |
| 2008/0244896 A1 * | 10/2008 | Bonhote et al. | 29/603.01 |
| 2008/0276448 A1 * | 11/2008 | Pentek | 29/603.14 |

* cited by examiner

*Primary Examiner* — Angel Castro
(74) *Attorney, Agent, or Firm* — Cantor Colburn LLP; Dwayne Nelson

(57) ABSTRACT

The invention is directed to a magnetic write head configured for writing to a magnetic medium, such as, a magnetic tape along a longitudinal direction x. The magnetic write head includes a trailing pole with a first face of height $r_1$; a leading pole with a second face, each of the first face and second face being arranged to face the magnetic medium in operation; and a magnetic gap of height g between the trailing pole and the leading pole. The height $r_1$ and the height g are such that $r_1 \leq 1.0$ g and each of the height g and the height $r_1$ is measured parallel to said longitudinal direction x.

2 Claims, 4 Drawing Sheets

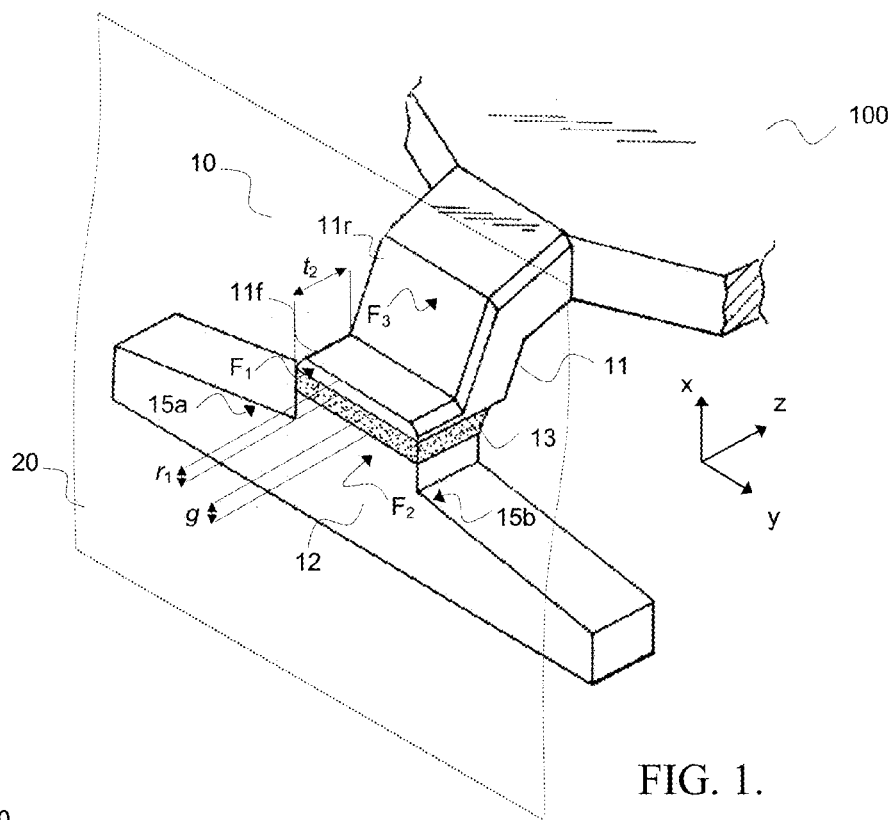
FIG. 1.
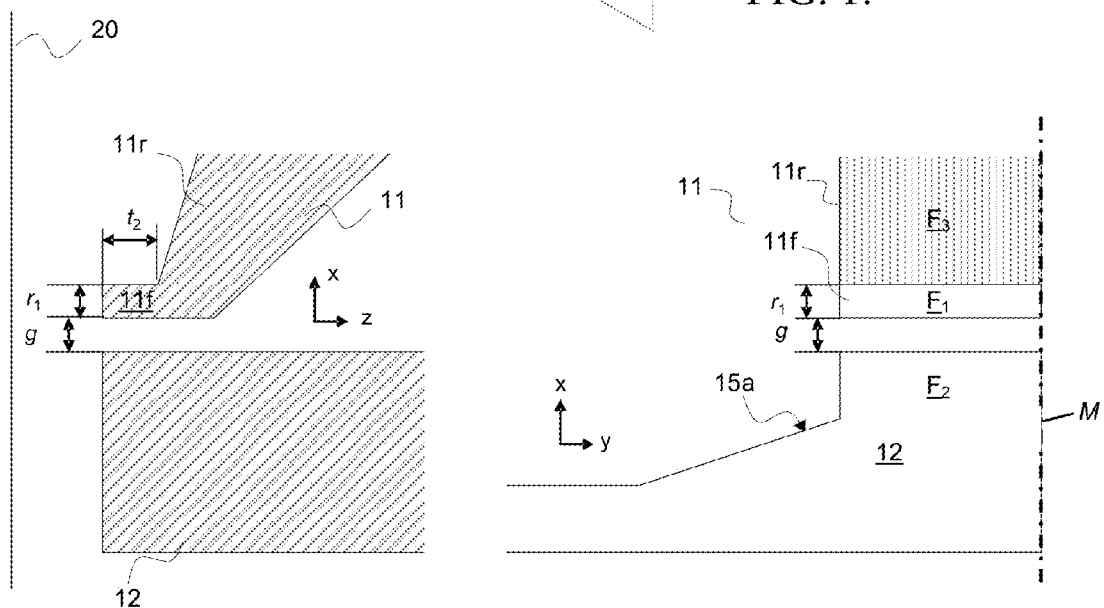
FIG. 2.A  FIG. 2.B

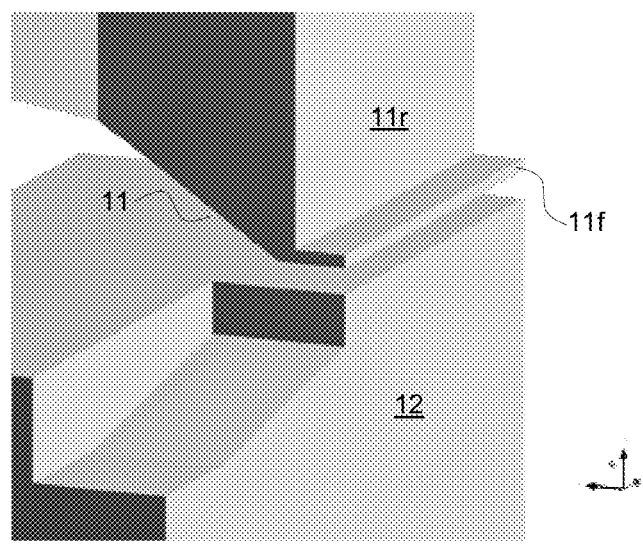
FIG. 3.
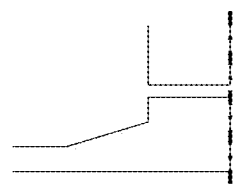
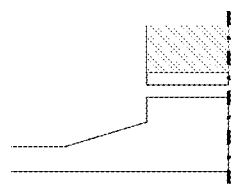
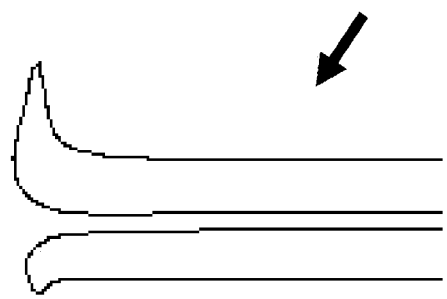
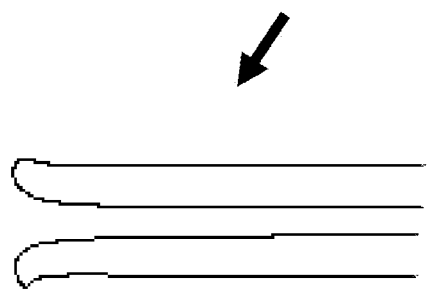
FIG. 4.A          FIG. 4.B

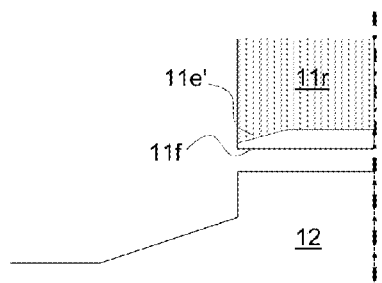
FIG. 5.A
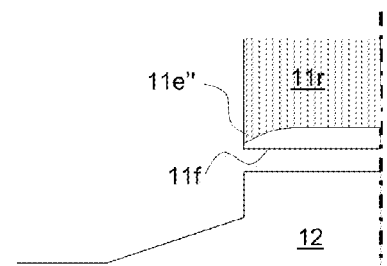
FIG. 5.B
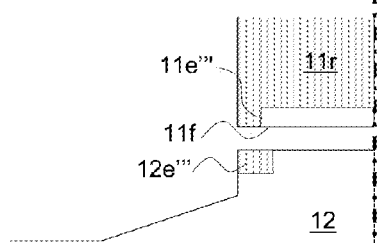
FIG. 5.C
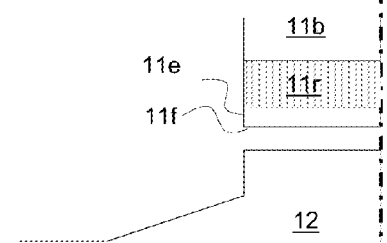
FIG. 5.D
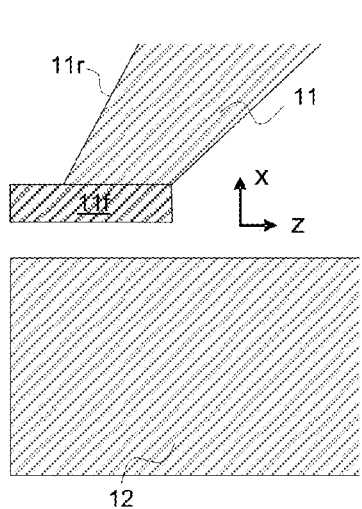
FIG. 6.A
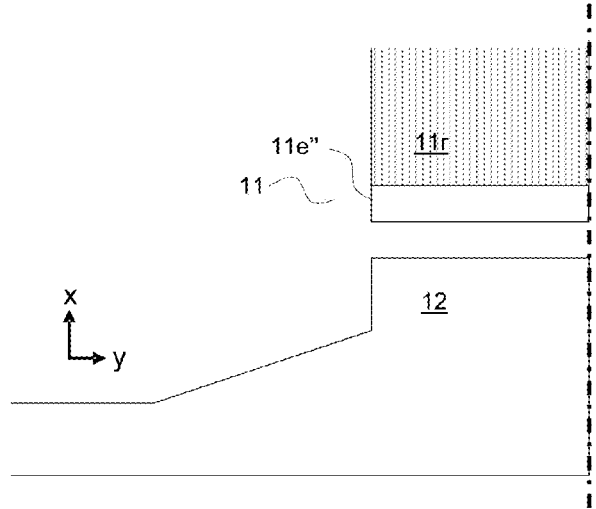
FIG. 6.B

MAGNETIC WRITE HEAD WITH STRUCTURED TRAILING POLE

CROSS-REFERENCE TO RELATED APPLICATION

This application is a continuation of and claims priority from U.S. patent application Ser. No. 13/441,183, filed Apr. 6, 2012, which in turn claims priority under 35 U.S.C. §119 from European Patent Application No. 11162391.4 filed Apr. 14, 2011, the entire contents of both are incorporated herein by reference.

BACKGROUND OF THE INVENTION

1. Field of the Invention

The invention relates to the field of magnetic write heads for writing a magnetic medium such as a magnetic tape, apparatuses, for example, magnetic tape devices, equipped with such heads, and methods of operation thereof.

2. Description of Related Art

The usable width of a data track in magnetic storage depends on the degree of fidelity with which the ideal transition shape (e.g., a straight line segment) can be imprinted through the volume of the media. Writing of magnetic data is typically achieved by fringing fields arising in the vicinity of the poles of a gapped, "ring"-shaped electromagnet. Because the fringing fields inherently produce finite field distortions at the lateral edges of the poles, the edges of the imprinted transitions are distorted. This results in a "dead" band of finite width at the edge of the written track in which the media is insufficiently uniformly magnetized to contribute to read back signal amplitude.

As track widths tend to decrease in tape products to meet higher areal density requirements, it can be realized that the proportion of the "dead" written track increases. This implies a less efficient use of available media area. This also results in a lower limit of useable media area, unless the width of the "dead" band can be scaled down (at least) at the same rate as the width of the track. Currently, at the level of the technology employed in products, the better known type of distortion is the finite decay length of the write field (and resulting magnetization of the media) in the lateral direction. Often, this effect extends beyond the edges of the write poles, thus impacting the effective track width by over-writing the adjacent track. To date, the acknowledged means of limiting this lateral distortion are to decrease the width of the write gap and to ensure that the edges of the two write poles are well aligned in the cross-track direction. In practice the later can be achieved by the use of "notching" in fabrication, see e.g. U.S. Pat. No. 5,949,625.

As the tape industry moves towards media having smaller magnetic particles with perpendicular orientation, scaled-down tracks, and shorter average bit lengths, other types of distortion become important, notably those that affect the shape of the written-in transition line as opposed to those involving finite abruptness at the lateral edges. One such distortion manifests as a curvature of the transition line immediately track-inwards of the physical edges of the poles ("coma" shape). When this curvature deviates from the ideal straight line, the read back signal amplitude at the track edge is degraded, leading to a loss in signal to noise ratio and hence in a degradation of system performance (as opposed to a reduction in width of the neighboring track).

Moreover, in order to continue scaling tape drive systems to higher areal densities and capacities, it is important to find methods that result in an improved write quality and hence to an improved signal to noise ratio (SNR) of the readback signal. This can be achieved by writing more abrupt transitions, characterized by a small value of the so called transition parameter "a". This improved SNR can then be used to increase either or both the linear density or the track density.

SUMMARY OF THE INVENTION

One aspect of the present invention provides a magnetic write head configured for writing to a magnetic medium such as a magnetic tape, along a longitudinal direction x, the magnetic write head including: a trailing pole with a first face of height $r_1$; a leading pole with a second face, where each of the first face and the second face is arranged to face the magnetic medium, in operation; and a magnetic gap of height g between the trailing pole and the leading pole, where the height $r_1$ and the height g are such that $r_1 \leq 1.0$ g, and where each of the height g and the height $r_1$ are measured parallel to said longitudinal direction x.

Another aspect of the present invention provides a magnetic write head configured for writing to a magnetic medium such as a magnetic tape, along a locally longitudinal direction x of the magnetic medium, the magnetic write head including: a trailing pole with a first face of height $r_1$; a leading pole with a second face, where each of the first face and the second face is arranged to face the magnetic medium, in operation; and a magnetic gap of height g between the trailing pole and the leading pole, where said height $r_1$, measured parallel to said longitudinal direction x, is less than 300 nm.

Another aspect of the present invention provides an apparatus including a magnetic write head configured for writing to a magnetic medium such as a magnetic tape, along a longitudinal direction x, the magnetic write head including: a trailing pole with a first face of height $r_1$; a leading pole with a second face, where each of the first face and the second face is arranged to face the magnetic medium, in operation; and a magnetic gap of height g between the trailing pole and the leading pole, where the height $r_1$ and the height g are such that $r_1 \leq 1.0$ g, and where each of the height g and the height $r_1$ are measured parallel to said longitudinal direction x.

Another aspect of the present invention provides a method of writing a magnetic medium, including: providing a magnetic medium; providing an apparatus including a magnetic write head configured for writing to a magnetic medium such as a magnetic tape, along a longitudinal direction x, the magnetic write head including (1) a trailing pole with a first face of height $r_1$, (2) a leading pole with a second face, where each of the first face and the second face is arranged to face the magnetic medium, in operation, and (3) a magnetic gap of height g between the trailing pole and the leading pole, where the height $r_1$ and the height g are such that $r_1 \leq 1.0$ g, and where each of the height g and the height $r_1$ are measured parallel to said longitudinal direction x; and writing the magnetic medium via the apparatus.

BRIEF DESCRIPTION OF THE DRAWINGS

In order to describe features and benefits of the embodiment of the invention in detail, the following drawings will be referred to. Where possible, same or similar reference number will be used in drawings and description to denote same or similar part, in which:

FIG. 1 schematically illustrates a representation of a write pole arrangement in a magnetic write head, in embodiments.

FIGS. 2.A and 2.B show simplified representations of a cross-section view and a plane view, respectively, of a write pole geometry according to embodiments.

FIG. 3 is a corresponding perspective view.

FIGS. 4.A and 4.B compare calculated effective write field magnitude contours at the surface of a tape, for a longitudinally or perpendicularly oriented medium. FIG. 4.A: conventional pole geometry. FIG. 4.B: poles structured according to embodiments.

FIGS. 5.A-6.B depicts various possible variants to FIGS. 2.A-B.

DETAILED DESCRIPTION OF THE PREFERRED EMBODIMENTS

Figure 7:
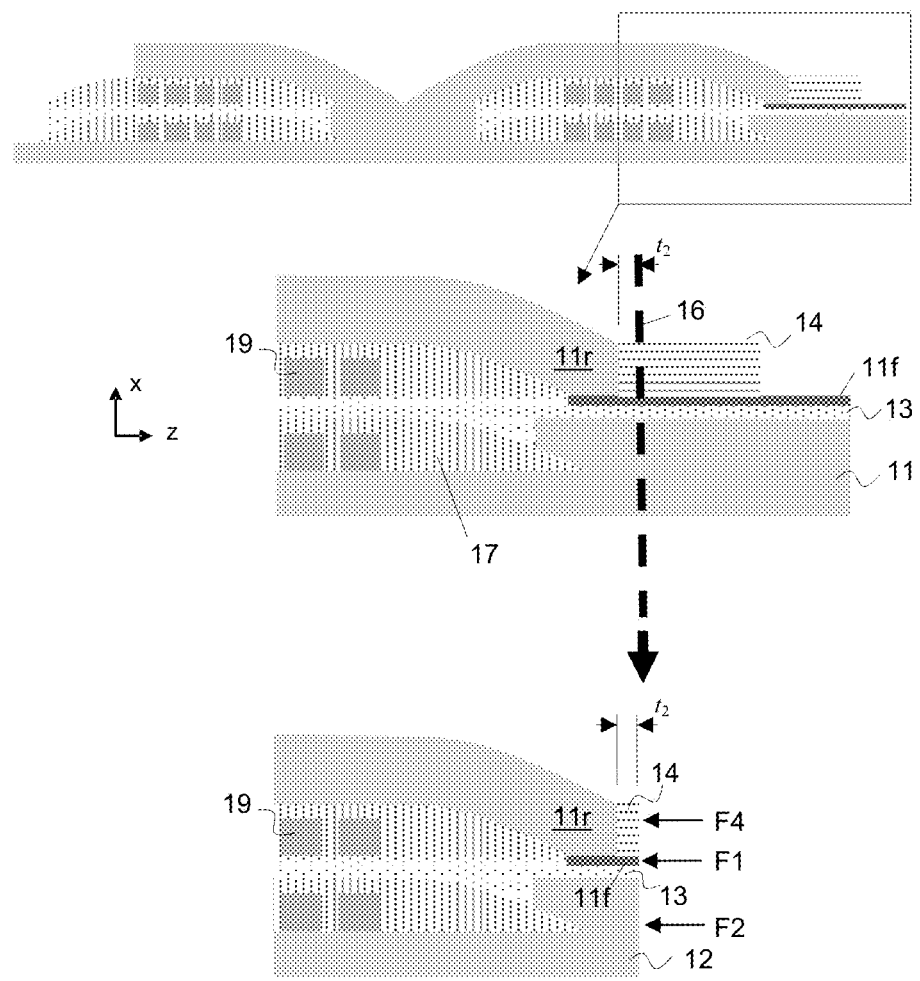
FIG. 7 depicts an embodiment involving two layers of coils (side view).

A typical magnetic write head includes: a trailing pole, a leading pole and a magnetic gap between said poles. As present inventors realized, the cause of the "coma" distortion is related to the fact that the lines of magnetic flux are tightly bunched and divergent as they emerge from sharp, convex, boundaries of a volume of high-permeability material—such as the corner of the write pole in the present context. This results in a flared-out shape of the fringing write field at this location, and correspondingly in a distortion of its imprint on the magnetic media. This effect can for instance be clearly observed with magnetic force microscopy images of magnetic transitions written on, for example, a BaFe media (not shown). One means of suppressing this flare-out, as present inventors have discovered using notably numerical simulations, is to decrease the longitudinal (x) dimension (or the height $r_1$) of the trailing (writing) pole to below a critical value. This critical value can generally be taken as the height g of the magnetic gap, i.e., $r_1 \leq 1.0$ g (in practice, $r_1 \leq 300$ nm). In other words, it is possible to suppress the flare-out by constricting the path of flux geometrically. This entails substantially reducing the length of the surface of the trailing pole which comes into contact with the magnetic medium, compared to conventional pole geometries of ring heads.

For instance, FIG. 1 partially depicts a magnetic tape device 100. More precisely it focuses on a magnetic write head 10 thereof, showing a write pole arrangement according to embodiments of the invention. FIGS. 2.A and 2.B respectively show simplified representations of a cross-section view and a plane view (partial view) of the corresponding write pole geometry. FIG. 3 is a corresponding perspective (partial) view. In FIG. 2.B, only the symmetrical part of the head is shown, assuming mirror symmetry on each side of mirror plan M. The same convention will be used for other plane views, see e.g., FIGS. 5-6, yet mirror symmetry is not mandatory for the present invention.

In reference to FIGS. 1-3, the head 10 is generally designed for writing to a magnetic medium 20. A tape 20 is hereafter considered, for the sake of illustration only, along a longitudinal direction x. Obviously, how said tape is rendered in FIG. 1 or 2.A is merely symbolic, it being reminded that a real tape has a finite thickness (typically ~⅓ of g for the magnetic layer) and a small spacing to the write poles (~1/10 g). Similarly, the reader may appreciate that features of the elements depicted may be exaggerated, oversimplified or even omitted, for clarity.

The head notably includes:
a trailing pole 11, the latter having a first face F1 of height $r_1$, and
a leading pole 12 with a second face F2, each of F1 and F2 facing the magnetic medium, for example, a tape 20, in operation. It further includes a magnetic gap 13 of height g between the poles. The heights $r_1$ and g are measured along direction x. How to manufacture such an head is known. For the practical realization of embodiments described herein, known manufacture processes just require to be adapted such that the heights $r_1$ and g satisfies the dimensional constraints described below. This shall be further discussed in reference to FIG. 7.

To start with, the heights $r_1$ and g satisfies $r_1 \leq 1.0$ g, as said earlier. In fact, the desirable range for $r_1$ appears to scale in very weak dependence of the write gap and in strong dependence of the ratio of permeabilities of the pole and surrounding materials. Thus, for conventional product materials (NiFe 45/55) and write gap g (300 nm), a typical upper-limit for $r_1$ which produces an observable effect is 300 nm. Yet, considering instead 150 nm as an upper limit noticeably improves the flare-out, decreasing its spatial extent in the x direction by roughly 10%. Results can be further improved when 15 nm<$r_1$<150 nm. Now, a definition that allows for different materials would be $r_1 \leq 1.0$ g. In particular, results can be improved when restricting $r_1$ to 0.1 g<$r_1$<1.0 g. Further restricting the value of $r_1$ to $r_1 \leq 0.5$ g ($r_1 \approx 50$ nm in a concrete example) results in an improvement in the write quality as characterized by an reduction in the transition parameter and increase in signal amplitude at high transition density. Finally, since the present embodiments preferably apply to the context of tapes and ring heads, in contrast to single-pole heads, the height g of the magnetic gap is typically between 50 and 500 nm.

More in details now and as seen in FIGS. 1-3, the trailing pole 11 preferably includes a recessed portion 11r, showing a third face F3 to the tape 20, in operation. The non-recessed portion 11f is the portion exhibiting face F1 of height $r_1$. The face F3 is recessed with respect to F1, opposite to the magnetic medium, in the direction z perpendicular to the tape. Providing a recessed portion is advantageous in terms of reducing the head reluctance and hence to improving the head efficiency.

F3 is for instance recessed a minimal distance $t_2$ with respect to F1, in the direction z. As seen, the surface of F3 is substantially larger than the surface of F1. Yet, owing to the recessed structure, F3 shall be farther from the tape. Furthermore, it does not need to be parallel to F1, i.e., F3 is recessed a "minimal distance" $t_2$ with respect to F1.

Next, it can be desirable to maintain a moderate aspect ratio of the write pole (i.e., its depth in z divided by its length in x, i.e., $t_2/r_1$). In some cases, large aspect ratios may lead to premature saturation in the constriction, which affects the efficiency of the head and prevents achieving the field magnitude required to write. Small aspect ratios tend to reduce the abruptness of the written transition along the longitudinal direction. Accordingly, a first-tier range for optimal $t_2$ can be defined as 0.5 $r_1$<$t_2$<2.00 $r_1$. A second-tier range, entailing these trade-offs, would be 0.25 $r_1$<$t_2$<10.0 $r_1$.

In addition, the leading pole may further include one or more notches 15a, 15b, arranged to reduce the effective surface of F2, i.e., the leading pole. Since mirror symmetry is assumed, the leading pole typically includes two notches 15a, 15b.

Although the shape of F1 may be graded towards the track edge to counteract flare-out of the fringing field, it appears here that this is not necessary. A basic rectangular shape can also achieve the desired effect, providing it is short enough in the x direction. Thus, various trailing pole shapes can be contemplated, as exemplified in FIGS. 5-6.

In FIG. 5.A, the shape of the non-recessed portion 11f tapers off linearly towards the pole edge 11e', while in FIG. 5.B, it exhibits a curved taper 11e''. In FIG. 5.C, it shows a truncation 11e''' short of the pole edge (with additional recessing 12e''' of the leading pole to preclude overwriting). Finally, in FIG. 5.D, the non-recessed portion exhibits a basic rectangular shape with a straight edge 11e, as in the previous embodiments. Yet, the recessing of the trailing pole does here not extend to the full length, see 11b. This is advantageous when using subtractive methods such as focused ion beam milling in the fabrication process as it reduces the time required for this step and hence reduces the cost. Note that this last modification could be combined with any other variants discussed above.

That basic rectangular shapes can nonetheless be used for the non-recessed portion 11f substantially simplifies practical implementations. For instance FIGS. 6.A-6.B illustrate a pole arrangement geometry similar to that of FIGS. 2.A-2.B, except that a layered composite of two materials is used, one of the material's volume coinciding with the non-recessed portion 11f of the write pole.

At present, advantages of the embodiments of FIGS. 1-3 are discussed, by comparison to conventional writer geometries. FIGS. 4.A and 4.B show typical effective write field magnitude contours at the surface of tape (corresponding to a distance of 30 nm from the writer recording surface), as obtained from a simulation. The writer gap used for the simulation is g=300 nm. The effective write field is the ratio of the writer head field to the switching field of the medium. The effective write fields were calculated for a perpendicular medium that reverses its magnetization according to the Stoner-Wohlfarth model. Similar results would be obtained for a longitudinal medium that also reverses according to the Stoner-Wohlfarth model. FIG. 4.B demonstrates that the new writer structure (with $r_1$=50 nm and $t_2$=150 nm) significantly reduces the field distortions at the edge of the writer, compared to a conventional one, see the inset in FIG. 4.A.

In addition, simulations have been performed to simulate a medium magnetization resulting from 0.5-µm-wide shingled tracks written with a conventional writer geometry vs. improved writer structures such as that of FIGS. 2.A-2.B. More in details, the medium was considered to be perpendicularly oriented and to reverse according to the Stoner-Wohlfarth model. The readback signal output vs. lateral position was calculated for a 0.34-µm-wide shielded magnetoresistive reader, for given test track profiles. There, the comparison has demonstrated that new pole structures can substantially improve the effective written track width, leading to readback signal outputs in close agreement with curves corresponding to the readback signal output from an ideally written track (with undistorted transitions).

Next, aspects concerning practical manufacture of magnetic heads according to embodiments are discussed.

One approach is for instance to adapt the conventional thin-film fabrication procedure such that the write pole is deposited in two additive steps, one with a thickness corresponding to the targeted pole length $r_1$ and a conventional in-plane outline (in-plane referring here to the plane in which the head is fabricated), the other that complements the first layer's to complete the top pole of the writer and uses an outline which overlaps the first's, except for a truncation along the z axis such that this thicker portion of the pole is retracted from the targeted pole surface level by the distance $t_2$. In this approach, care should be taken to achieve a lapping end-point accuracy that is substantially smaller than $t_2$. To that aim, additional material (e.g., resist) can be used to define the extent of the recessed portion. In that respect, a low-permeability 14 material may be arranged, filling in a space delimited in part by the recessed portion 11r and the non-recessed portion 11f, as seen in FIG. 7.

FIG. 7 illustrates an embodiment of the invention with two layers of coils 19 (side view), with emphasis put on the tape end, as well as a machining operation to obtain a suitable pole structure. As seen, additional material 14 defines the extent of top recessed pole 11r. Typically, the following materials can be used:

Coil 19: Cu;
Non-recessed portion 11f: FeCo;
Recessed pole 11r: FeNi;
Gap material 13: $Al_2O_3$; and
Embedding material 17: hard-baked photoresist.

Reference 16 denotes a lapping plane. After dicing the substrate upon which the writers are fabricated in order to expose the write gap, the exposed surface is polished using a lapping process to create a flat surface defined by the lapping plane and to control the distance t2. More generally, any suitable machining operation can be used, such as to obtain a front pole surface delimited by lapping plane 16. As a result of the machining operation, the tape face F4 of the additional material 14 is flush with F1 and F2, as illustrated in the lower part of FIG. 7. The resulting geometry (flush) is less subject to wear. For the same reasons, F1 and F2 (and preferably the magnetic gap tape face too) are arranged flush, independently of whether additional material 14 is provided or not.

Another approach is to start from conventional write heads and to employ a subtractive fabrication step to recess those regions of the write pole that are to be retracted from the pole surface by $t_2$. This could be done, for example by using a focused ion beam tool, or a lithography step followed by ion milling. Still other manufacturing processes can be contemplated.

The present invention extends to apparatuses such as magnetic tape devices, equipped with one or more magnetic write heads such as described above. Also, it extends to methods of operating such heads and apparatuses, where magnetic media are written using such devices.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims. For example, other magnetic materials than those evoked above can be relied upon. Yet, the embodiments described above preferably apply to the context of tapes and ring heads, in contrast to single-pole heads, for example, for perpendicular recording in HDD single-pole geometry. Thus, the height g of the magnetic gap is here typically between 50 and 500 nm. Typically, the trailing pole shall include high-permeability magnetic materials, with optionally a low-permeability material filling in the space delimited by the recessed and non-recessed portions.

We claim:

1. A method of writing a magnetic medium, comprising:
   providing a magnetic medium;
   providing an apparatus comprising a magnetic write head configured for writing to a magnetic medium along a longitudinal direction x; and
   writing the magnetic medium via the apparatus;
   wherein the magnetic write head comprises:
      a trailing pole with a first face of height $r_1$, the trailing pole comprising a non-recessed portion that is truncated short of a trailing pole edge;

a leading pole with a second face, wherein each of the first face and the second face is arranged to face the magnetic medium, in operation; and a magnetic gap of height g between the trailing pole and the leading pole;

wherein the height $r_1$ and the height g are such that $r_1 \leq 1.0$ g, and wherein each of the height g and the height $r_1$ are measured parallel to said longitudinal direction x.

2. A non-transitory computer readable article of manufacture tangibly embodying computer readable instructions which, when executed, cause a computer to carry out the steps of a method for writing a magnetic medium according to claim 1.

* * * * *